(12) United States Patent
Niimi et al.

(10) Patent No.: US 8,685,535 B2
(45) Date of Patent: Apr. 1, 2014

(54) SURFACE PROTECTIVE FILM

(75) Inventors: Kenjiro Niimi, Ibaraki (JP); Masato Yamagata, Ibaraki (JP); Hiromoto Haruta, Ibaraki (JP); Yuka Sekiguchi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 155 days.

(21) Appl. No.: 13/029,339

(22) Filed: Feb. 17, 2011

(65) Prior Publication Data

US 2011/0206917 A1 Aug. 25, 2011

(30) Foreign Application Priority Data

Feb. 22, 2010 (JP) ................................. 2010-036328

(51) Int. Cl.
*B32B 7/12* (2006.01)
*B32B 15/04* (2006.01)

(52) U.S. Cl.
USPC ...................... 428/343; 428/354; 428/355 AC (58) Field of Classification Search
USPC .................................... 428/343, 354, 355 AC
See application file for complete search history.

(56) References Cited

U.S. PATENT DOCUMENTS

| | | | |
|---|---|---|---|
| 6,465,330 B1 | 10/2002 | Takahashi et al. |
| 2005/0256251 A1 | 11/2005 | Amano et al. |
| 2006/0057371 A1 | 3/2006 | Kobayashi et al. |
| 2006/0177651 A1 | 8/2006 | Tomita |
| 2007/0087133 A1 | 4/2007 | Cho et al. |
| 2008/0254249 A1 | 10/2008 | Hayashi et al. |
| 2010/0143633 A1 | 6/2010 | Kanada et al. |

FOREIGN PATENT DOCUMENTS

| | | |
|---|---|---|
| CN | 101326254 | 12/2008 |
| EP | 1595929 | 11/2005 |
| EP | 1640427 | 3/2006 |
| JP | 10-189504 | 7/1998 |
| JP | 11-116927 | 4/1999 |
| JP | 2000-068237 | 3/2000 |
| JP | 2004-211070 | 7/2004 |
| JP | 2005-23143 | 1/2005 |
| JP | 2005-325255 | 11/2005 |
| JP | 2006-111856 | 4/2006 |
| JP | 2007-63298 | 3/2007 |

(Continued)

OTHER PUBLICATIONS

Search report from E.P.O. that issued with respect to patent family member European Patent Application No. 11154919.2, mail date is Jul. 25, 2011.

(Continued)

*Primary Examiner* — Victor Chang
(74) *Attorney, Agent, or Firm* — Greenblum & Bernstein, P.L.C.

(57) ABSTRACT

A surface protective film that exhibits superior adhesiveness to an adherend and exhibits only small differences in peel strength according to the surface state of an adherend is provided. The surface protective film 10 is provided with an acrylic pressure-sensitive adhesive (PSA) layer 2 on one side of a support 1, and satisfies the following conditions: a thickness reduction ratio (indentation strain E1) when a compressive stress of 0.195 MPa is applied for 10 minutes to a laminate 20 obtained by laminating 24 of the protective films 10 is 7.0% or more, and a ratio (E1/E2) of E1 to a thickness reduction ratio (permanent strain) E2 that remains 10 minutes after the stress is released is 30 or less; and a peel strength S1 on a plain TAC polarizing plate is two times or less a peel strength S2 on a TAG polarizing plate that has been subjected to AG treatment.

20 Claims, 3 Drawing Sheets

(56) References Cited

FOREIGN PATENT DOCUMENTS

| JP | 2008-1838 | 1/2008 |
|---|---|---|
| JP | 2008-44984 | 2/2008 |
| JP | 2008-069202 | 3/2008 |
| JP | 2008-69261 | 3/2008 |
| JP | 2008-096734 | 4/2008 |
| JP | 2008-280375 | 11/2008 |
| WO | 2009-075512 | 6/2009 |

OTHER PUBLICATIONS

U.S. Appl. No. 12/956,057 to Shou Uchida et al., which was filed Nov. 30, 2010.
U.S. Appl. No. 12/956,063 to Shou Uchida et al., which was filed Nov. 30, 2010.
U.S. Appl. No. 13/028,278 to Keiji Hayashi et al., which was filed Feb. 16, 2011.
U.S. Appl. No. 13/104,400 to Mariko Yoshida et al., which was filed May 10, 2011.
U.S. Appl. No. 13/011,405 to Maiko Hayata et al., which was filed Jan. 21, 2011.
U.S. Appl. No. 13/033,099 to Maiko Hayata et al., which was filed Feb. 23, 2011.
U.S. Appl. No. 13/035,150 to Maiko Hayata et al., which was filed Feb. 25, 2011.
Chinese Office Action for Application No. 201110043975.9, mailed on Jul. 26, 2013; and an English translation thereof.
"Submission of Publication" from JP Application No. JP2010-036328, and figure 1 attached to Exhibit 2 of the Submission, mailed on Sep. 19, 2013; along with an English translation thereof.
The Measuring Method about Young's Modulus of Plastics Using the Indenting Hardness Test by a Spherical Indenter, Transactions of Japan Society of Mechanical Engineers (edition A), vol. 53, No. 495, pp. 2193-2202 (Nov. 1987).
Japanese Office Action for Application No. JP2010-036328, mailed on Dec. 5, 2013; and an English translation thereof.
Chinese Office Action dated Jan. 17, 2014 of CN201110043975.9 with English translation.

INITIAL THICKNESS → THICKNESS DURING COMPRESSION → THICKNESS AFTER RELEASING COMPRESSION

SURFACE PROTECTIVE FILM

CROSS-REFERENCE

This application claims priority to Japanese Patent Application No. 2010-036328 filed on Feb. 22, 2010, the entire contents of which are incorporated herein by reference.

BACKGROUND OF THE INVENTION

1. Field of the Invention

The present invention relates to a surface protective film that is provided with a film-shaped support and a pressure-sensitive adhesive (PSA) provided on the support, and that protects an adherend by being laminated to the adherend.

2. Description of the Related Art

Surface protective films (to also be referred to as surface protective sheets) typically have a configuration in which a PSA is provided on a film-shaped support (substrate). These protective films are laminated to an adherend by means of a PSA as described above, and are therefore used for the purpose of protecting the adherend from damage and soiling during processing or transport. For example, liquid crystal display panels are formed by laminating optical members such as a polarizing plate or retardation plate to liquid crystal cells by means of PSA. Protective films are laminated to these optical members laminated to the liquid crystal cells by means of PSA for the purpose of preventing damage, soiling and the like. These protective films are then removed by being peeled from the optical members (adherends) together with the PSA at the stage the protective films are no longer required such as when the optical members are laminated to the liquid crystal cells. Examples of technical literatures relating to surface protective films include Japanese Patent Application Publication Nos. 2008-69261 and 2005-23143. Japanese Patent Application Publication No. H11-116927 relates to a technology for improving moisture permeability of a PSA layer.

The peel strength when peeling a protective film adhered to an adherend from the adherend can vary according to, for example, the surface state and the materials that compose the surface of the adherend. A detailed explanation of this is provided using the example of the case of the adherend being a polarizing plate. Normally, a polarizing plate has a structure in which a protective layer composed of triacetyl cellulose (TAC) is laminated to a polarizer composed of polyvinyl alcohol (PVA) by means of PSA. This protective layer is imparted with functions corresponding to its application. For example, anti-glare (AG) treatment is carried out on the surface of the protective layer by forming fine surface irregularities therein in order to reduce glare caused by ambient light. As a result, in contrast to the surface (TAC side) of a polarizing plate not imparted with such a function (plain polarizing plate) being smooth, the surface (AG side) of a polarizing plate subjected to AG treatment (AG polarizing plate) has surface irregularities. The peel strength of the protective film tends to differ greatly between the TAC side and the AG side depending on such differences in surface state (surface structure). Moreover, this AG treatment is typically by coating (AG coating) the surface of a TAC protective layer using a coating agent composed of a material having lower polarity than TAC. As a result, in contrast to the TAC side being smooth and having comparatively high polarity, the side on which the AG coating is carried out (AG side) has surface irregularities and relatively low polarity. These differences in chemical characteristics and differences in physical structure result in large differences in the peel strengths of the TAC side and AG side. This difference in peel strength can cause a decrease in work efficiency when peeling the protective film from the polarizing plate. However, costs are incurred in order to make peel strength uniform by using different protective films corresponding to surface state.

Japanese Patent Application Publication No. 2008-69261 describes that differences in adhesiveness can be reduced according to the surface state of an adherend and the like by a PSA composition containing a (meth)acrylic polymer, obtained by copolymerizing a monomer having an alkylene oxide structure, and an ionic liquid salt. However, this technology demonstrates this effect by having a ionic liquid salt as an essential constituent thereof (paragraphs 0061 to 0062 of this publication), and in actuality, according to studies conducted by the present inventor, a PSA composition in which the ionic liquid salt has been excluded from the composition of Japanese Patent Application Publication No. 2008-69261 was confirmed to not allow the obtaining of the effect of reducing differences in adhesiveness attributable to differences in surface state. In order to realize soiling resistance to an adherend at a high level, it is desirable to avoid a composition that essentially requires the use of an ionic liquid salt. Japanese Patent Application Publication No. 2005-23143 relates to a technology for reducing dependency of peel strength on peeling speed by lowering high-speed peeling strength, not for reducing differences in peel strength caused by differences in surface state of an adherend.

In addition, protective films are required to have a property that allows it to tightly (closely) adhere to an adherend to which the protective film is adhered (adhesiveness). If a protective film is in a state in which it has lifted from the surface of the adherend, the appearance of the adherend laminated to the protective film changes due to air bubbles present between the protective film and the adherend in cases in which the adherend is subjected to external force or temperature changes. As a result, a difference in appearance occurs between a portion subjected to this external force and the like and a portion not subjected thereto, and this difference in appearance causes a decrease in the accuracy of visual inspections, and may even cause a decrease in yield.

Since fine surface irregularities are formed in the AG side of a polarizing plate as previously described, a protective film provided with a PSA that easily deforms along the surface irregularities (easily fills in the surface irregularities) is advantageous for tightly adhering the protective film to the AG side. However, when adhesiveness to a surface having fine surface irregularities (such as the AG side) is attempted to be improved, the difference in peel strength between the irregular surface and the flat surface generally tends to become even greater. Namely, improvement of adhesiveness to an adherend and reduction of differences in peel strength caused by differences in the surface state of an adherend are in a relationship such that the first characteristic decreases when the second characteristic is improved, thereby creating the need to enable each characteristic to be realized simultaneously.

SUMMARY OF THE INVENTION

An object of the present invention is to provide a surface protective film that is resistant to changes in appearance (differences in appearance) between a portion contacted by external force and a portion not contacted by external force even if subjected to external force after laminating a protective film, and demonstrates only small differences in peel strength according to the surface state of an adherend.

The present invention provides a surface protective film provided with a support and a PSA layer provided on a first side of the support. The PSA layer is formed of a PSA having an acrylic polymer as a base polymer thereof. The protective film satisfies both of the following conditions (A) and (B).

(A) An indentation strain E1 of a laminate obtained by laminating 24 of the surface protective films is 7.0% or more, and a ratio (E1/E2) of the indentation strain E1 to a permanent strain E2 is 30 or less, where the indentation strain E1 is a reduction ratio of a thickness T1 to an initial thickness T0 of the laminate, the thickness T1 being obtained when the laminate is placed between circular flat surfaces having a diameter of 8 mm, and a compressive stress of 0.195 MPa is applied for 10 minutes in the direction of thickness at 25° C. (namely, $E1=(1-T1/T0)\times 100$). The permanent strain E2 is a reduction ratio of a thickness T2 obtained 10 minutes after the laminate is released from the compressive stress, to the initial thickness T0 (namely, $E2=(1-T2/T0)\times 100$).

(B) During measurement of peel strength carried out under conditions of a measuring temperature of 23° C., a peeling speed of 30 m/min and a peeling angle of 180 degrees, a peel strength S1 of the surface protective film on a TAC polarizing plate that has not been subjected to AG treatment (plain polarizing plate) is two times or less a peel strength S2 of the surface protective film on a TAC polarizing plate that has been subjected to AG treatment (and typically, a TAC polarizing plate that has been subjected to an AG coating) (namely, a peel strength ratio S1/S2 is 2 or less).

A surface protective film that satisfies the conditions (A) and (B) can exhibit only small differences in peel strength according to the surface state of an adherend (or in other words, has little dependency of peel strength on the adherend) and superior adhesiveness to the surface of an adherend. This surface protective film is preferable for use as a protective film used in applications for protecting, for example, an optical member (such as a polarizing plate of a liquid crystal display) during production or transport of that optical member.

In a preferable aspect of the surface protective film disclosed herein, more than 99.0% of the surface area of the PSA layer is tightly adhered to the AG-treated TAC polarizing plate (and typically, a TAC polarizing plate that has been subjected to an AG coating) 30 minutes after the surface protective film is pressed onto the AG-treated TAC polarizing plate. Since this surface protective film demonstrates superior adhesiveness to a surface containing surface irregularities (such as the AG side of the polarizing plate), the occurrence of lifting and progression thereof can be highly inhibited even if subjected to external force and temperature changes.

A PSA layer containing a compound having a polyoxypropylene segment composed of two or more consecutive oxypropylene units (oxypropylene group-containing compound) in addition to the acrylic polymer can be preferably employed for the PSA layer in the techniques disclosed herein. A surface protective film provided with this PSA layer is advantageous for easily satisfying the conditions (A) and (B), and particularly for easily satisfying condition (B).

A PSA layer in which the acrylic polymer is crosslinked with an isocyanate-based crosslinking agent can be preferably employed for the PSA layer in the techniques disclosed herein. A surface protective film provided with this PSA layer is advantageous for easily satisfying the conditions (A) and (B), and particularly for easily satisfying condition (A).

A thickness of, for example, 10 μm to 40 μm is suitable for the thickness of the PSA layer. A surface protective film provided with this PSA layer is advantageous for easily satisfying the conditions (A) and (B), and particularly for easily satisfying condition (A).

A polyester film having a thickness of 20 μm to 60 μm can be preferably employed for the support. A surface protective film of this configuration is advantageous for easily satisfying the conditions (A) and (B), and particularly for easily satisfying condition (A). In addition, since a surface protective film provided with this support has suitable toughness and strength, it is also preferable from the viewpoint of handling during production and use (when adhering to an adherend and/or when peeling from an adherend).

In addition, a support formed of a synthetic resin film that has been subjected to antistatic treatment can be preferably used for the support. Since synthetic resin films are easily charged by static electricity, the use of a synthetic resin film that has been subjected to antistatic treatment is particularly preferable in surface protective films used in applications sensitive to static electricity such as in electronic equipment or liquid crystal materials.

DETAILED DESCRIPTION OF THE INVENTION

Preferred embodiments of the present invention will be described below. Technical matters necessary to practice the invention, other than those specifically referred to in the present description, may be understood as design matters for a person skilled in the art that are based on the related art in the pertinent field. The present invention may be practiced based on the contents disclosed herein and common general technical knowledge in the pertinent field. Embodiments described in the drawings are schematic representations for providing a clear explanation of the present invention, and do not accurately represent the size or scale of the surface protective film of the present invention actually provided as a product.

The surface protective film disclosed herein (such as a surface protective film that protects the surface of an optical component such as a polarizing plate or retardation plate during processing or transport of that optical component, and typically a surface protective film used for an optical component used as a constituent element of a liquid crystal display) can typically be that of a form referred to as a PSA sheet, PSA tape, PSA label or PSA film and the like. Although the PSA layer is typically formed continuously, it is not limited to such a form, but rather may be a PSA layer formed in a regular or random pattern such as dots or stripes. The surface protective film provided by the present invention may be in the form of a roll or sheets.

Figure 1:
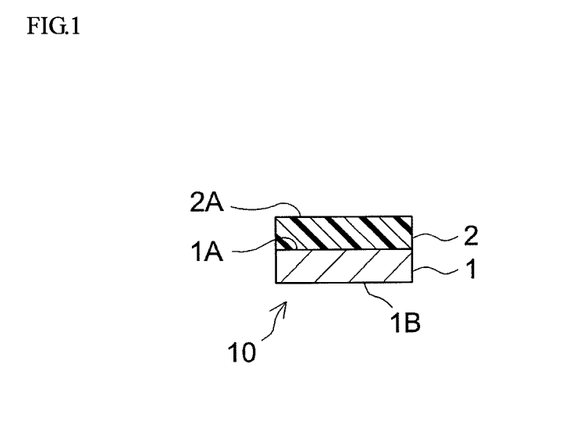
FIG. 1 is a schematic cross-sectional view showing an example of the configuration of a surface protective film according to the present invention.
Figure 2:
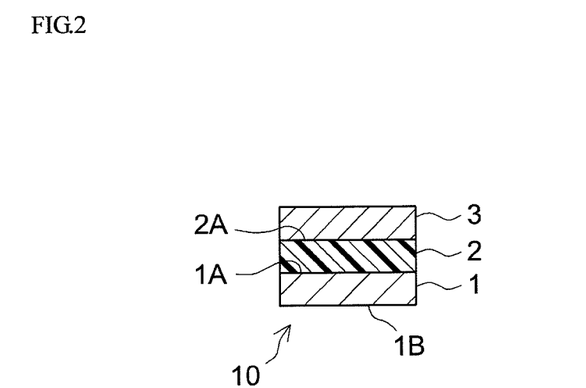
FIG. 2 is a schematic cross-sectional view showing another example of the configuration of a surface protective film according to the present invention.

An example of the typical configuration of the surface protective film provided by the present invention is schematically shown in FIG. 1. This surface protective film 10 is provided with a sheet-shaped support (substrate) 1, and a PSA layer 2 provided on a first side (one side) 1A thereof, and a surface 2A of the PSA layer 2 is used by adhering to an adherend (protection target, such as the surface of an optical component such as a polarizing plate). The surface protective film 10 prior to use (namely, before adhering to the adherend) can be of a typical form in which the surface (side adhered to the adherend) 2A of the PSA layer 2 is protected by a release liner 3 in which at least the side facing the PSA layer 2 serves as the peeled side as shown in FIG. 2. Alternatively, the surface protective film 10 may also be of a form in which the other side 1B of the support 1 (back side of the side on which the PSA layer 2 is provided) serves as the peeled side, and the PSA layer 2 contacts the other side enabling the surface thereof to be protected by winding the protective film 10 into the shape of a roll.

The surface protective film disclosed herein is characterized in that, with respect to the indentation strain E1 and permanent strain E2 measured under prescribed conditions for a laminate obtained by laminating 24 sheets of the surface protective film, the indentation strain E1 is 7.0% or more and the ratio (E1/E2) of the indentation strain E1 to the permanent strain E2 is 30 or less (Characteristic (A)). Moreover, the surface protective film is characterized in that, the peel strength S1 on a TAC polarizing plate that has not been subjected to AG treatment (TAC side) is two times or less the peel strength S2 on a TAC polarizing plate that has been subjected to AG treatment (AG side), namely the peel strength ratio S1/S2 is 2 or less (Characteristic (B)).

Figure 3:
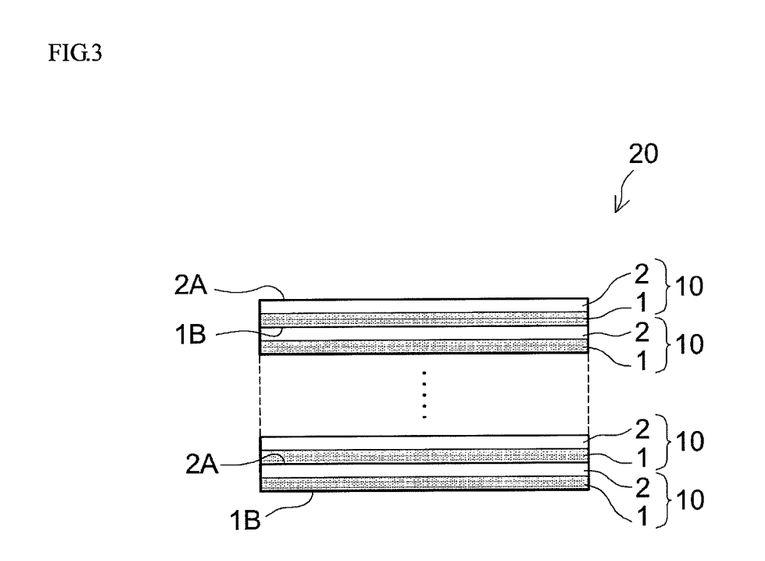
FIG. 3 is a side view schematically showing the configuration of a sample for a compressive creep test.

With respect to the Characteristic (A), measurement of the indentation strain E1 and the permanent strain E2 is carried out by a compressive creep test in a measuring environment at 25° C. by applying compressive stress to the laminate (test sample) in the direction of thickness and then releasing that stress. The structure of the sample used in the compressive creep test is schematically shown in FIG. 3. This sample 20 is a laminate of a form in which a total of 24 sheets of the surface protective film 10 are superimposed so that the surface (PSA side) 2A of the PSA layer of one surface protective film 10 is laminated to the back side 1B of the support (other side of the support 1) of another surface protective film 10. These 24 sheets of the surface protective film 10 preferably have roughly the same surface area and shape. An example of a preferable method for producing the sample 20 consists of preparing 24 sheets of the surface protective film 10 having a suitable surface area, and then stamping out the laminate to a desired size (size corresponding to the sample 20).

Figure 4:
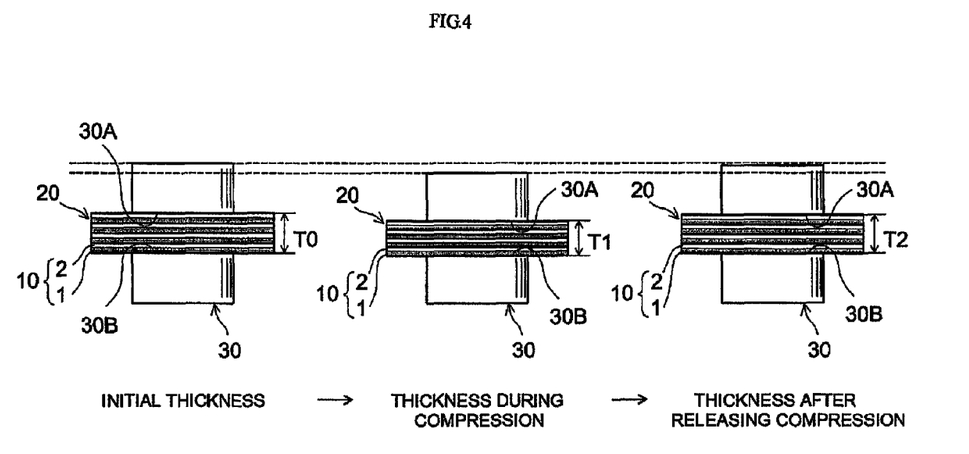
FIG. 4 is an explanatory drawing schematically showing the method of a compressive creep test.

The compressive creep test can be carried out using a jig having circular flat surfaces (end surfaces) of a diameter of 8 mm on the ends thereof. For example, as shown in FIG. 4, a jig (parallel jig) 30, in which at least the vicinities of the end surfaces thereof are formed to have a cylindrical shape of a diameter of 8 mm can be preferably employed. A pair of end surfaces 30A and 30B of this jig 30 are made to contact locations corresponding to each side of the sample 20 in the direction of lamination (state shown on the left side in FIG. 4). The distance between the end surfaces 30A and 30B at this time corresponds to the thickness T0 of the sample 20 before testing (namely, in the initial state).

Compressive stress is applied in the direction of thickness of the sample 20 by causing the end surfaces 30A and 30B of the jig 30 to approach each other (state shown in the center in FIG. 4). The magnitude of this compressive stress is 1000 g per 8 mm of diameter (namely, the sizes of the end surfaces 30A and 30B) (equivalent to a pressure of 0.195 MPa). After maintaining a state in which this compressive strain is applied for 10 minutes, the thickness (thickness during compression) T1 is determined from the distance between the end surfaces 30A and 30B at this time. The indentation strain E1 is the reduction ratio of the thickness during compression T1 from the initial thickness T0, and is determined according to the following equation: $E1=(1-T1/T0)\times 100$.

Once 10 minutes have elapsed from application of the compressive stress, the sample 20 is released from the compressive stress (state shown on the right side in FIG. 4), and the thickness T2 of the sample 20 after a lapse of 10 minutes from the release of the compressive stress is determined. This thickness (thickness after release) T2 can be measured by, for example, according to the distance between the end surfaces 30A and 30B when the end surface 30A is gently contacted with the sample 20 held on the end surface 30B. The permanent strain E2 is a reduction ratio of the thickness after release T2 from the initial thickness T0, and is determined according to the following equation: $E2=(1-T2/T0)\times 100$. In FIG. 4, the number of sheets of the surface protective film 10 that compose the sample 20 is abbreviated to make it easier to view the drawing.

There are no particular limitations on the size of the sample for the compressive creep test provided it is a size that enables application of a pressure (load) of 0.195 MPa. For example, in the case of using a jig having a diameter of the end surfaces thereof of 8 mm as previously described, a size such as that of a cylindrical column in which the bottom surface thereof is a circle having a diameter of about 8 to 15 mm, or a square column in which the bottom surface thereof is a square measuring 8 to 15 mm on one side, can be preferably employed. For example, measured values obtained using a sample in the shape of a square column having a bottom surface measuring 10 mm on a side in the same manner as in the examples to be subsequently described can be employed as values of E1 and E2 in the techniques disclosed herein.

A large value for the indentation strain E1 means that the sample 20 is easily deformed by external force. In general, most of the indentation strain E1 is due to deformation of the PSA layer 2, and the PSA layer 2 can be said to deform easily if the value of the indentation strain E1 of the sample 20 is large. The surface protective film 10 provided with the PSA layer 2 that easily deforms to a degree such that the indentation strain E1 is 7.0% or more (and may be 7.5% or more) enables the PSA layer 2 to easily deform along fine surface irregularities in the manner of the AG side as a result of being pressed against a surface having the fine surface irregularities when adhered to that surface. Although there are no particular limitations on the upper limit of E1, in consideration of the balance with other characteristics (such as the ratio E1/E2 or residual PSA prevention to be described later), it is suitable to normally make E1 20% or less (for example, 15% or less).

In addition, a low ratio of the indentation strain E1 to the permanent strain E2 (E1/E2, to also be referred to as "strain recovery coefficient") means that the strain remaining after removing an external force relative to the strain when the external force was applied is comparatively large (or in other words, it is difficult to recover the strain). For example, although the PSA layer 2 of the surface protective film 10 having a large indentation strain E1 is able to deform along the fine surface irregularities previously described when pressed against a surface having those fine surface irregularities, if the strain recovery coefficient E1/E2 is excessively large, since the PSA layer 2 that has been released from the pressing is able to highly recover to the shape prior to being pressed (prior to deforming along the surface irregularities), adhesiveness to the surface ends up decreasing. On the other hand, even if the strain recovery coefficient E1/E2 is small, when the indentation strain E1 is excessively small, since the property of deforming along the surface irregularities during adhesion is inherently lacking, adhesiveness again becomes low. According to the techniques disclosed herein, a surface protective film can be realized that exhibits superior adhesiveness even to a surface having fine surface irregularities due to synergistic effects resulting from making the indentation strain E1 large to a certain degree (typically, E1 7.0%) and making the strain recovery coefficient E1/E2 small to a certain degree (typically, E1/E2≤30). E1/E2 is preferably 20 or less (more preferably 15 or less, and for example, 10 or less). According to this surface protective film, particularly superior adhesiveness (such as adhesiveness of 99.5% or more) can be realized. Although there are no particular limitations on the lower limit of E1/E2, it is normally 3 or more and typically 5 or more (for example, 7 or more). The value of E2 can be, for example, about 0.1 to 3.0% (and typically, 0.2 to 2.0%).

With respect to the characteristic (B), measurement of peel strengths S1 and S2 is carried out under conditions of a measuring temperature of 23° C., a peeling speed of 30 m/min and a peeling angle of 180 degrees. More specifically, values measured in the same manner as the measurement of peel strength described in the subsequent examples (by applying, for example, a similar adherend, procedure, measurement conditions and the like) can be employed preferably. Normally, the peel strength S1 on the TAC side is clearly higher than the peel strength S2 on the AG side. In a surface protective film that demonstrates a preferable indentation strain E1 disclosed herein, the value of the peel strength ratio S1/S2 in particular easily becomes high. For example, if the crosslinked density of the PSA layer is decreased (the amount of crosslinking agent used is reduced), the indentation strain E1 becomes large and the peel strength on an adherend tends to increase. This increase in peel strength tends to have a greater effect on the peel strength S1 on the TAC side than the peel strength S2 on the AG side. As a result, the peel strength ratio S1/S2 ends up becoming even larger.

Since the surface protective film disclosed herein satisfies the condition of peel strength ratio S1/S2≤2, there is little difference in peel strength according to the surface state of an adherend. Thus, work consisting of peeling the protective film from the adherend (such as a polarizing plate) can be carried out efficiently. Although there are no particular limitations on the lower limit of S1/S2, normally S1/S2>1 and typically S1/S2≥1.1.

An example of a technique that can be suitably employed to lower S1/S2 of a surface protective film consists of containing an oxypropylene group-containing compound to be described later in the PSA layer. Examples of other techniques that are useful for lowering S1/S2 include reducing the thickness of the PSA layer, increasing the amount of crosslinking agent used, and adding an appropriate additive. These techniques can be used alone or can be used in a suitable combination thereof.

Next, an explanation is provided of the acrylic polymer serving as the base polymer (main component of the polymer components, or in other words, the component accounting for 50% by weight or more of all polymer components) of the PSA layer in the techniques disclosed herein. Here, an "acrylic polymer" refers a polymer having for the main constituent monomer component thereof (monomer main component, or in other words, component that accounts for 50% by weight or more of the total amount of monomer that composes the acrylic polymer) a monomer having at least one (meth)acryloyl group in a molecule thereof (to also be referred to as an "acrylic monomer"). In particular, an acrylic polymer having an alkyl(meth)acrylate for the main constituent monomer component thereof is preferable.

In the present description, a "(meth)acryloyl group" collectively refers to an acryloyl group and a methacryloyl group. Similarly, a "(meth)acrylate" collectively refers to an acrylate and methacrylate.

A compound represented by the following formula (1) can be preferably used as an alkyl(meth)acrylate.

Here, $R^1$ in the formula (1) represents a hydrogen atom or methyl group. $R^2$ represents an alkyl group having 1 to 20 carbon atoms. The alkyl group may be linear or branched. Specific examples of alkyl(meth)acrylates represented by formula (1) include methyl(meth)acrylate, ethyl(meth)acrylate, propyl(meth)acrylate, n-butyl(meth)acrylate, isobutyl (meth)acrylate, sec-butyl(meth)acrylate, t-butyl(meth)acrylate, pentyl(meth)acrylate, isopentyl(meth)acrylate, hexyl (meth)acrylate, heptyl(meth)acrylate, n-octyl(meth)acrylate, isooctyl(meth)acrylate, 2-ethylhexyl(meth)acrylate, nonyl (meth)acrylate, isononyl(meth)acrylate, decyl(meth)acrylate, isodecyl(meth)acrylate, undecyl(meth)acrylate, dodecyl (meth)acrylate, tridecyl(meth)acrylate, tetradecyl(meth) acrylate, pentadecyl(meth)acrylate, hexadecyl(meth) acrylate, heptadecyl(meth)acrylate, octadecyl(meth) acrylate, nonadecyl(meth)acrylate and eicosyl(meth) acrylate. Among these, from the viewpoint of easily obtaining a PSA having superior adhesiveness characteristics, alkyl (meth)acrylates in which $R^2$ represents an alkyl group having 2 to 14 carbon atoms (the range of this number of carbon atoms may also be represented by $C_{2-14}$) are preferable, while alkyl(meth)acrylates in which $R^2$ represents a $C_{4-10}$ alkyl group (such as an n-butyl group or 2-ethylhexyl group) are more preferable.

In a preferable aspect, one species or two or more species selected from alkyl(meth)acrylates in which $R^2$ in the formula 1 represents a $C_{2-14}$ alkyl group preferably account for roughly 50% by weight or more (typically 50 to 99.9% by weight), more preferably 70% by weight or more (typically 70 to 99.9% by weight), and for example, about 85% by weight or more (typically 85 to 99.9% by weight), of the total amount of alkyl(meth)acrylate used to synthesize the acrylic polymer. An acrylic polymer obtained from such a monomer composition is preferable in that it facilitates the formation of a PSA that exhibits favorable adhesiveness characteristics.

In a more preferable aspect, an alkyl(meth)acrylate in which $R^2$ in the formula 1 represents a $C_{6-14}$ alkyl group preferably accounts for roughly 50% by weight or more (typically 50 to 99.9% by weight), more preferably 70% by weight or more (typically 70 to 99.9% by weight), and for example, about 85% by weight or more (typically 85 to 99.9% by weight), of the total amount of alkyl(meth)acrylate used to synthesize the acrylic polymer. An acrylic polymer having such a monomer composition is preferable in that it facilitates the imparting of a PSA that is preferable for a surface protective film. For example, since peeling force from an adherend (peel strength on an adherend) is easily controlled to a low level, a PSA is easily obtained that has superior repeelability. For example, a composition in which $R^2$ in the formula 1 is a $C_{6-14}$ alkyl acrylate (such as 2-ethylhexyl acrylate) can be preferably employed.

An acrylic polymer obtained by copolymerizing an acrylic monomer having a hydroxyl group (—OH) can be preferably used for the acrylic polymer in the techniques disclosed herein. Specific examples of acrylic monomers having a hydroxyl group include 2-hydroxyethyl(meth)acrylate, 2-hydroxypropyl(meth)acrylate, 3-hydroxypropyl(meth)acrylate, 2-hydroxybutyl(meth)acrylate, 4-hydroxybutyl(meth) acrylate, 2-hydroxyheyl(meth)acrylate, 6-hydroxyhexyl (meth)acrylate, 8-hydroxyoctyl(meth)acrylate, 10-hydroxydecyl(meth)acrylate, 12-hydroxylauryl(meth) acrylate, (4-hydroxymethylcyclohexyl)methyl acrylate, polypropylene glycol mono(meth)acrylate, N-hydroxyethyl (meth)acrylamide and N-hydroxypropyl(meth)acrylamide. One species of these hydroxyl group-containing acrylic monomers may be used alone or two or more species may be used in combination. An acrylic polymer obtained by copolymerizing these monomers is preferable since it facilitates the imparting of a PSA preferable for a surface protective film. For example, since such a polymer is able to easily control peeling force to an adherend to a low level, a PSA having superior repeelability is easily obtained. Particularly preferable examples of hydroxyl group-containing acrylic monomers include (meth)acrylates containing a hydroxyl group such as 2-hydroxyethyl(meth)acrylate, 2-hydroxypropyl(meth)acrylate, 3-hydroxypropyl(meth)acrylate, 2-hydroxybutyl(meth)acrylate or 4-hydroxybutyl(meth)acrylate.

This hydroxyl group-containing acrylic monomer is preferably used within a range of roughly 0.1 to 15% by weight, more preferably within a range of roughly 0.2 to 10% by weight and particularly preferably within a range of roughly 0.3 to 8% (for example, 1 to 5%) by weight of the total amount of monomer used to synthesize the acrylic polymer. If the content of the hydroxyl group-containing acrylic monomer is excessively greater than the above ranges, the cohesive strength of the PSA becomes excessively large, fluidity (creep ability) decreases and wettability (adhesiveness) to the adherend tends to decrease. On the other hand, if the content of the hydroxyl group-containing acrylic monomer is excessively less than the above ranges, it may become difficult to adequately demonstrate the effect of using the monomer.

From the viewpoint of easily obtaining balance among adhesive performance, normally an acrylic polymer having a glass transition temperature (Tg) of roughly 0° C. or lower (and typically, −100° C. to 0° C.) is used for the acrylic polymer in the techniques disclosed herein. An acrylic polymer having a Tg within the range of roughly −100° C. to −5° C. is preferable, while that having a Tg within the range of −80° C. to −10° C. (for example, −70° C. to −30° C.) is more preferable. If the value of Tg is excessively higher than the above ranges, initial adhesiveness during use in the vicinity of normal temperatures easily becomes inadequate, and workability of adhering a protective film may decrease. In addition, it may also become difficult to realize preferable values for compressive creep characteristics (indentation strain and/or strain recovery coefficient) disclosed herein. Tg of an acrylic polymer can be determined according to the glass transition temperature measurement method subsequently described in the examples. This value of Tg can be adjusted by suitably modifying the monomer composition of the acrylic polymer (namely, the types and ratios of the amounts used of the monomers used to synthesize the polymer).

Monomers other than those described above (other monomers) may also be copolymerized in the acrylic polymer in the techniques disclosed herein within a range that does not remarkably impair the effects of the present invention. Such monomers can be used for the purpose of, for example, adjusting Tg of the acrylic polymer or adjusting adhesive performance (such as peelability). For example, examples of monomers able to improve cohesive strength and heat resistance of a PSA include sulfonic acid group-containing monomers, phosphoric acid group-containing monomers, cyano group-containing monomers, vinyl esters and aromatic vinyl compounds. In addition, examples of monomers that can introduce a functional group into the acrylic polymer that can become a crosslinking site or contribute to improvement of adhesiveness include carboxyl group-containing monomers, acid anhydride group-containing monomers, amido group-containing monomers, amino group-containing monomers, imido group-containing monomers, epoxy group-containing monomers, (meth)acryloylmorpholine and vinyl ethers.

Examples of sulfonic acid group-containing monomers include styrene sulfonic acid, allyl sulfonic acid, 2-(meth) acrylamido-2-methylpropanesulfonic acid, (meth)acrylamidopropanesulfonic acid, sulfopropyl(meth)acrylate, (meth) acryloxynaphthalene sulfonic acid and sodium vinylsulfonate. Examples of phosphoric acid group-containing monomers include 2-hydroxyethyl acryloyl phosphate. Examples of cyano group-containing monomers include acrylonitrile and methacrylonitrile. Examples of vinyl esters include vinyl acetate, vinyl propionate and vinyl laurate. Examples of aromatic vinyl compounds include styrene, chlorostyrene, chloromethylstyrene, α-methylstyrene and other substituted styrenes.

Examples of carboxyl group-containing monomers include (meth)acrylic acid, carboxyethyl(meth)acrylate, carboxypentyl(meth)acrylate, itaconic acid, maleic acid, fumaric acid, crotonic acid and isocrotonic acid. Examples of acid anhydride group-containing monomers include maleic anhydride, itaconic anhydride and acid anhydride forms of the previously listed carboxyl group-containing monomers. Examples of amido group-containing monomers include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropyl methacrylamide and diacetone acrylamide. Examples of amino group-containing monomers include aminoethyl(meth)acrylate, N,N-dimethylaminoethyl (meth)acrylate and N,N-dimethylaminopropyl(meth)acrylate. Examples of imido group-containing monomers include cyclohexylmaleimide, isopropylmaleimide, N-cyclohexylmaleimide and itaconimide. Examples of epoxy group-containing monomers include glycidyl(meth)acrylate, methyiglycidyl(meth)acrylate and allyl glycidyl ether. Examples of vinyl ethers include methyl vinyl ether, ethyl vinyl ether and isobutyl vinyl ether.

Although one species of the "other monomers" may be used alone or two or more species may be used in combination, the total content thereof among the monomers used to synthesize the acrylic polymer is preferably roughly 40% by weight or less (and typically, 0.001 to 40% by weight), and more preferably roughly 30% by weight or less (and typically, 0.001 to 30% by weight). Alternatively, the acrylic polymer may have a composition that does not contain the other monomers (such as that obtained by using only $C_{6-14}$ alkyl(meth) acrylate as monomer, or that obtained by using only $C_{6-14}$ alkyl(meth)acrylate and hydroxyl group-containing (meth) acrylate).

In the case of using a monomer having a functional group such as a carboxyl group, sulfonic acid group or phosphoric acid group (such as an acrylic monomer having these acidic functional groups) for the other monomers described above, these monomers are preferably used such that the acid value of the acrylic polymer is at a limit of 29 or less (more preferably 16 or less, even more preferably 8 or less and particularly preferably 4 or less). As a result thereof, a phenomenon in which adhesiveness (and going even further, peeling force from an adherend) of a protective film adhered to an adherend increases over time can be suppressed and favorable repeelability can be maintained. The acid value of the acrylic polymer can be adjusted according the amount used of a monomer having an acidic functional group (namely, by adjusting the monomer composition). For example, in the case of an acrylic polymer obtained by using only 2-ethylhexylacrylate and acrylic acid as monomers, an acrylic polymer that satisfies an acid value of 29 or less can be obtained by making the amount of acrylic acid in a total of 100 parts by weight of these monomers 3.7 parts by weight or less. Alternatively, monomers having an acidic functional group may substantially not be used. In a mode of the surface protective film disclosed herein, a PSA layer is provided in which the protective film uses as a base polymer an acrylic polymer in which a monomer having an acidic functional group is substantially not copolymerized.

The weight average molecular weight of the acrylic polymer in the techniques disclosed herein is preferably within the range of $10 \times 10^4$ to $500 \times 10^4$, more preferably within the range of $20 \times 10^4$ to $400 \times 10^4$, and even more preferably within the range of $30 \times 10^4$ to $300 \times 10^4$. Here, weight average molecular weight (Mw) refers to the value as polystyrene obtained by gel permeation chromatography (GPC). If the Mw is excessively below the above ranges, the cohesive strength of the PSA becomes inadequate, and PSA may easily remain on the surface of an adherend. On the other hand, if the Mw is excessively above the above ranges, the fluidity of the PSA decreases, and in a surface protective film provided with that PSA, it can be difficult to realize preferable values for compressive creep characteristics (indentation strain and/or strain recovery coefficient) as disclosed herein.

There are no particular limitations on the method used to obtain the acrylic polymer having this monomer composition, and the polymer can be obtained by applying various types of polymerization methods commonly used as techniques for synthesizing acrylic polymers, examples of which include solution polymerization, emulsion polymerization, bulk polymerization and suspension polymerization. In addition, the acrylic polymer may be a random copolymer, block copolymer or graft copolymer. A random copolymer is normally preferable from the viewpoints of productivity and the like.

The PSA layer in the techniques disclosed herein can normally be preferably formed by using a PSA composition containing an acrylic polymer like that previously described. This PSA composition is typically composed so as to allow the acrylic polymer to be suitably crosslinked. As a result of this crosslinking, a PSA layer can be formed that exhibits particularly preferable performance for use in a surface protective film. A method that can be preferably employed as specific crosslinking means consists of introducing crosslinking sites into an acrylic polymer by copolymerizing a monomer having a suitable functional group (such as a hydroxyl group or carboxyl group), adding to the acrylic polymer a compound able to form a crosslinked structure by reacting with that functional group (crosslinking agent), and allowing that compound to react to react with the acrylic polymer. Various materials used to crosslink typical acrylic polymers can be used as crosslinking agents, examples of which include isocyanate compounds, epoxy compounds, melamine resins and aziridine compounds or derivatives thereof. One type of these crosslinking agents may be used alone or two or more types may be used in combination.

Isocyanate compounds are particularly preferably used for the crosslinking agent (isocyanate-based crosslinking agent) used in the PSA composition since they facilitate the obtaining of a surface protective film that realizes preferable values for compressive creep characteristics (indentation strain and/or strain recovery coefficient) as disclosed herein and facilitate adjustment of those compressive creep characteristics.

The use of an isocyanate compound is also preferable with respect to facilitating adjustment of peeling force from an adherend to a suitable range. Examples of these isocyanate compounds include aromatic isocyanates such as tolylene diisocyanate or xylylene diisocyanate; alicyclic isocyanates such as isophorone diisocyanate; and aliphatic isocyanates such as hexamethylene diisocyanate. More specific examples include lower aliphatic polyisocyanates such as butylene diisocyanate or hexamethylene diisocyanate; alicyclic isocyanates such as cyclopentylene diisocyanate, cyclohexylene diisocyanate or isophorone diisocyanate; aromatic diisocyanates such as 2,4-tolylene diisocyanate, 4,4'-diphenylmethane diisocyanate or xylylene diisocyanate; and isocyanate addition products such as trimethylolpropane/tolylene diisocyanate trimer addition product (Nippon Polyurethane Industry Co., Ltd., trade name: "Coronate L"), trimethylolpropane/hexamethylene diisocyanate trimer addition product (Nippon Polyurethane Industry Co., Ltd., trade name: "Coronate HL") or an isocyanurate form of hexamethylene diisocyanate (Nippon Polyurethane Industry Co., Ltd., trade name: "Coronate HX"). One species of these isocyanate compounds may be used alone or two or more species may be used in combination.

Examples of epoxy compounds used as crosslinking agents (epoxy-based crosslinking agent) include N,N,N',N'-tetraglycidyl-m-xylene diamine (Mitsubishi Gas Chemical Co., Inc., trade name: "Tetrad-X") and 1,3-bis(N,N-diglycidylaminomethyl)cyclohexane (Mitsubishi Gas Chemical Co., Inc., trade name: "Tetrad-C"). Examples of melamine resins include hexamethylol melamine. Examples of aziridine derivatives include commercially available products such as "HDU", "TAZM" or "TAZO" (trade names) manufactured by Sogo Pharmaceutical Co., Ltd.

The amount of the crosslinking agent used can be suitably selected corresponding to the composition and structure (such as molecular weight) of the acrylic polymer, mode of use of the surface protective film and the like. Normally, the amount of the crosslinking agent used based on 100 parts by weight of the acrylic polymer is suitably roughly 0.01 to 15 parts by weight, preferably roughly 0.1 to 10 parts by weight (for example, roughly 0.2 to 5 parts by weight), and more preferably roughly 0.2 to 2 parts by weight. If the amount of the crosslinking agent used is excessively low, the cohesive strength of the PSA becomes inadequate and PSA may easily remain on the surface of an adherend. On the other hand, if the amount of the crosslinking agent used is excessively high, the cohesive strength of the PSA becomes excessively large, fluidity decreases and it may be difficult to realize preferable values for compressive creep characteristics (indentation strain and/or strain recovery coefficient) as disclosed herein.

Another example of crosslinking means consists of incorporating a polyfunctional monomer having two or more radiation-reactive functional groups in a molecule thereof, and irradiating the polyfunctional monomer with radiation to crosslink (cure) the acrylic polymer. Examples of radiation-reactive functional groups include unsaturated groups such as vinyl groups, acryloyl groups, methacryloyl groups or vinylbenzyl groups. Normally, a polyfunctional monomer in which the number of radiation-reactive functional groups per molecule is 10 or less (for example, 2 to 6) is used preferably. One species of these polyfunctional monomers may be used alone or two or more species may be used in combination.

Specific examples of polyfunctional monomers include ethylene glycol di(meth)acrylate, diethylene glycol di(meth)acrylate, tetraethylene glycol di(meth)acrylate, neopentylglycol di(meth)acrylate, 1,6-hexanediol di(meth)acrylate, trimethylolpropane tri(meth)acrylate, pentaerythritol tri(meth)

acrylate, dipentaerythritol hexa(meth)acrylate, divinylbenzene and N,N'-methylenebisacrylamide.

The amount of the polyfunctional monomer used can be suitably selected corresponding to the composition and structure (such as molecular weight) of the acrylic polymer, the mode of use of the surface protective film and the like. Normally, 0.1 to 30 parts by weight of polyfunctional monomer are suitably incorporated based on 100 parts by weight of the acrylic polymer. In applications that emphasize greater flexibility and adhesiveness, the incorporated amount of the polyfunctional monomer based on 100 parts by weight of the acrylic polymer may be 10 parts by weight or less (for example, 0.1 to 10 parts by weight).

Examples of radiation that can be used in crosslinking reactions include ultraviolet rays, laser rays, α-rays, β-rays, γ-rays, X-rays and electron beam. Normally ultraviolet rays (for example, ultraviolet rays having a wavelength of about 200 to 400 nm) are used preferably from the viewpoints of favorable controllability and handling ease as well as in terms of cost. A suitable light source such as a high-pressure mercury lamp, microwave-excited discharge lamp or chemical lamp can be used to radiate the radiation.

In the case of using ultraviolet rays for the radiation, normally a photopolymerization initiator is preferably added to the PSA composition. A substance that generates radicals (photoradical polymerization initiator) or substance that generates cations (photocation polymerization initiator) by irradiating with ultraviolet rays of a suitable wavelength capable of triggering the polymerization reaction can be used for the photopolymerization initiator corresponding to the type of radiation-reactive functional group contained in the PSA composition.

Examples of photoradical polymerization initiators include benzoins such as benzoin, benzoin methyl ether, benzoin ethyl ether, o-benzoyl benzoic acid methyl-p-benzoin ethyl ether, benzoin isopropyl ether or α-methylbenzoin; acetophenones such as benzyldimethylketal, trichloroacetophenone, 2,2-diethoxyacetophenone or 1-hydroxycyclohexyl phenyl ketone; propiophenones such as 2-hydroxy-2-methylpropiophenone or 2-hydroxy-4'-isopropyl-2-methylpropionphenone; benzophenones such as benzophenone, methylbenzophenone, p-chlorobenzophenone or p-dimethylaminobenzophenone; thioxanthones such as 2-chlorothioxanthone, 2-ethylthioxanthone or 2-isopropylthioxanthone; acylphosphine oxides such as bis(2,4,6-trimethylbenzoyl)-phenylphosphine oxide, 2,4,6-trimethylbenzoyldiphenylphosphine oxide or 2,4,6-trimethylbenzoylethoxyphenylphosphine oxide; as well as benzyl, dibenzosuberone and α-acyloxime ester.

Examples of photocation polymerization initiators include onium salts such as aromatic diazonium salts, aromatic iodinium salts or aromatic sulfonium salts; organometallic complexes such as iron-allene complex, titanocene complex or allylsilanol-aluminum complex; as well as nitrobenzyl esters, sulfonic acid derivatives, phosphate esters, phenolsulfonate esters, diazonaphthoquinone and N-hydroxyimidosulfonate.

One species of these photopolymerization initiators may be used alone or two or more species may be used in combination. The amount of photopolymerization initiator used can be, for example, roughly 0.1 to 10 parts by weight based on 100 parts by weight of the acrylic polymer. Normally, roughly 0.2 to 7 parts by weight of photopolymerization initiator are preferably incorporated for 100 parts by weight of the acrylic polymer.

Photo-initiated polymerization assistant such as amines can also be used in combination. Examples of these photo-initiated polymerization assistants include 2-dimethylaminoethylbenzoate, dimethylaminoacetophenone, p-dimethylaminobenzoate ethyl ester and p-dimethylaminobenzoate isoamyl ester. One species of these photo-initiated polymerization assistants may be used alone or two or more species may be used in combination. The amount of the photo-initiated polymerization assistant used is preferably roughly 0.05 to 10 parts by weight (for example, roughly 0.1 to 7 parts by weight) based on 100 parts by weight of the acrylic polymer.

A crosslinking catalyst for more effectively promoting any of the crosslinking reactions described above can also be contained in the PSA composition. A tin-based catalyst (such as dibutyltin dilaurate in particular) can be preferably used for the crosslinking catalyst. Although there are no particular limitations on the amount of the crosslinking catalyst (for example, a tin-based catalyst such as dibutyltin dilaurate) used, the amount used can be made to be, for example, roughly 0.005 to 1 part by weight based on 100 parts by weight of the acrylic polymer. The combined use of, for example, an isocyanate-based crosslinking agent and a tin-based crosslinking catalyst is preferable.

In a preferable mode of the technology disclosed herein, the PSA layer contains, in addition to the acrylic polymer functioning as a base polymer, an oxypropylene group-containing compound having a moiety composed of two or more consecutive oxypropylene units (namely, a structural moiety represented by —$(OC_3H_6)_n$—, provided that $n \geq 2$). In the following explanation, this moiety composed of two or more consecutive oxypropylene units may be referred to as a "polyoxypropylene segment". In addition, a moiety composed of two or more consecutive oxyethylene units (—$OC_2H_4$—, and typically, —$OCH_2CH_2$—) may be referred to as a "polyoxyethylene segment". As a result of containing this oxypropylene group-containing compound in the PSA layer as necessary, the peel strength S1 on a TAC polarizing plate not subjected to AG treatment can be made to be considerably lower than the peel strength S2 on a TAC polarizing plate subjected to AG treatment. As a result thereof, the peel strength ratio S1/S2 can be lowered and adjusted to obtain a preferable S1/S2 ration disclosed herein. Namely, the use of the oxypropylene group-containing compound is a preferable example of a technique able to be employed as necessary in order to realize S1/S2≤2.

Various types of known materials having the structure described above can be used either alone or in a suitable combination for the oxypropylene group-containing compound. For example, polypropylene glycol (PPG), compounds containing oxypropylene units and oxyethylene units (wherein the arrangement of these units may be random or in block form) or derivatives thereof can be used. PPG having diol, triol or hexaol molecular structures can be used for the PPG Compounds containing oxypropylene units and oxyethylene units in which the number of oxypropylene units accounts for 50% or more of the total number of these units are preferable for use as the compounds containing oxypropylene units and oxyethylene units. Specific examples of these compounds include PPG-polyethylene glycol (PEG)-PPG block copolymers, PPG-PEG block copolymers and PEG-PPG-PEG block copolymers. Examples of the derivatives include compounds containing oxypropylene groups in which the ends thereof have been etherified (such as PPG monoalkyl ethers or PEG-PPG monoalkyl ethers).

The oxypropylene group-containing compound is typically used by adding to and mixing with a pre-polymerized (synthesized) acrylic polymer. Thus, differing from the case of using this compound as a copolymer component of the acrylic polymer, an oxypropylene group-containing compound of a structure that does not have a radical polymerizable functional group (such as an acryloyl group or methacryloyl group) can also be preferably employed. Examples of oxypropylene group-containing compounds that are particularly preferable for the present invention include PPG diols and PPG triols. PPG diols are used particularly preferably.

The number average molecular weight of the oxypropylene group-containing compound is preferably within a range of roughly $0.2 \times 10^3$ to $10 \times 10^3$ (and particularly preferably roughly $0.2 \times 10^3$ to $5 \times 10^3$, and for example, roughly $1 \times 10^3$ to $5 \times 10^3$). Here, number average molecular weight (Mn) refers to the value as polystyrene obtained by GPC. If the Mn is excessively lower than the above ranges, it may be difficult to suitably exhibit the effect of reducing differences in peel strength according to the surface state of an adherend (such as the effect of causing the value of the peel strength ratio to approach 1). If the Mn is excessively higher than the above ranges, compatibility between the acrylic polymer and the oxypropylene group-containing compound tends to be inadequate, possibly resulting in a decrease in transparency of the PSA layer or a decreasing trend in the level of soiling resistance to an adherend.

The amount used (incorporated) of the oxypropylene group-containing compound based on 100 parts by weight of the acrylic polymer can be, for example, roughly 0.01 to 10 parts by weight, preferably roughly 0.03 to 5 parts by weight, and more preferably roughly 0.05 to 3 parts by weight. If the amount of the oxypropylene group-containing compound used is excessively less than the above ranges, it may be difficult to adequately demonstrate the effect of adjusting the peel strength ratio S1/S2 (and typically, reduce the value of S1/S2). If the amount of the oxypropylene group-containing compound used is excessively greater than the above ranges, the level of soiling resistance to an adherend may tend to decrease.

The PSA composition used to form the PSA layer in the techniques disclosed herein can contain various types of conventionally known additives as necessary. Examples of these additives include surface lubricants, leveling agents, antioxidants, preservatives, photostabilizers, ultraviolet absorbers, polymerization inhibitors, silane coupling agents and inorganic or organic fillers. In addition, a known and/or commonly used tackifier resin may also be incorporated in a PSA composition having an acrylic polymer as a base polymer thereof.

The support that composes the surface protective film disclosed herein can be various types of synthetic resin film (plastic film), paper, non-woven fabric and the like. From the viewpoint of having a superior surface protective function, normally a synthetic resin film is preferably used for the support. There are no particular limitations on the material (resin material) that composes the synthetic resin film provided it can be formed into the form of a sheet or film. Examples include polyolefin films such as those composed of polyethylene, polypropylene, poly-1-butene, poly-4-methyl-1-pentene, ethylene-propylene copolymer, ethylene-1-butene copolymer, ethylene-vinyl acetate copolymer, ethylene-ethyl acrylate copolymer or ethylene-vinyl alcohol copolymer; polyester films such as those composed of polyethylene terephthalate, polyethylene naphthalate or polybutylene terephthalate; polyimide films such as those composed of Nylon 6, Nylon 6,6 or partially aromatic polyamides; as well as synthetic resin films composed of resin materials such as polyacrylate films, polystyrene films, polyvinyl chloride films, polyvinylidene chloride films or polycarbonate films (which may have a monolayer structure or laminated structure comprising two or more layers of different materials).

The use of a polyester film (and typically, a polyethylene terephthalate film) is particularly preferable. Although the thickness of the support can be suitably selected corresponding to the purpose of use, it is normally about 5 μm to 200 μm and preferably about 10 μm to 100 μm. The thickness of the support is preferably about 20 μm to 60 μm from the viewpoint of facilitating the obtaining of a surface protective film that satisfies the characteristics (A) and (B).

Various types of additives such as fillers (such as inorganic fillers or organic fillers), aging preventive agents, antioxidants, ultraviolet absorbers, lubricants, plasticizers or colorants (such as pigments or dyes) may be incorporated in the synthetic resin film as necessary. A commonly known or commonly used surface treatment such as acid treatment, alkaline treatment, corona discharge treatment, plasma treatment, ultraviolet radiation treatment or coating of an undercoating agent may be carried out on the surface of the support (surface on the side on which the PSA layer is provided). This surface treatment can be treatment that, for example, enhances adhesiveness between the PSA layer and the support (anchoring property of the PSA layer). In addition, mold release or soiling prevention treatment may also be carried out on the support as necessary using a conventionally known mold release agent (such as a silicone-based, fluorine-based, long chain alkyl-based or fatty acid amide-based agent).

A support formed of a synthetic resin film subjected to antistatic treatment can be preferably employed for the support of the surface protective film disclosed herein. There are no particular limitations on the method used to carry out antistatic treatment, and examples of methods that can be used include a method in which an antistatic layer is provided on at least one side of the film, and a method in which an antistatic agent is mixed into the film.

Examples of methods of providing an antistatic layer on at least one side of the film include a method consisting of coating an antistatic agent and, as necessary, an antistatic coating agent containing the resin component used, a method consisting of coating an electroconductive polymer and, as necessary, an electroconductive coating agent containing another resin component used, and a method consisting of vapor-depositing or plating an electroconductive substance.

Examples of antistatic agents (antistatic components) contained in the antistatic coating agent include cationic antistatic agents having a cationic functional group such as a quaternary ammonium salt, pyridinium salt or primary, secondary or tertiary amine group; anionic antistatic agents having an anionic functional group such as a sulfonate ester, sulfate ester, phosphonate ester or phosphate ester; amphoteric antistatic agents such as alkyl betaines and derivatives thereof, imidazoline and derivatives thereof or analine and derivatives thereof; nonionic antistatic agents such as amino alcohols and derivatives thereof, glycerin and derivatives thereof or polyethylene glycol and derivatives thereof; and ionic electroconductive polymers obtained by polymerizing or copolymerizing a monomer having a cationic, anionic or amphoteric ionic electroconductive group. One type of these antistatic agents may be used alone or two or more types may be used in combination.

Specific examples of cationic antistatic agents include acrylic copolymers having a quaternary ammonium group such as alkyl trimethyl ammonium salt, acryloylamide propyl trimethyl ammonium methosulfate, alkylbenzyl methyl ammonium salt, acylcholine chloride or poly(dimethyl aminoethyl methacrylate); styrene copolymers having a quaternary ammonium group such as poly(vinyl benzyltrimethyl ammonium chloride); and diallylamine copolymers having a quaternary ammonium group such as poly(diallyldimethyl ammonium chloride). Specific examples of anionic antistatic agents include alkyl sulfonates, alkylbenzene sulfonates, alkyl sulfate esters, alkylethoxy sulfate esters, alkyl phosphate esters and sulfonic acid group-containing styrene copolymers. Specific examples of amphoteric antistatic agents include alkyl betaines, alkyl imidazolium betaines and carbobetaine graft copolymers.

Specific examples of nonionic antistatic agents include fatty acid alkyloylamides, di(2-hydroxyethyl)alkylamines, polyoxyethylene alkylamines, fatty acid glycerin esters, polyoxyethylene glycol fatty acid esters, sorbitan fatty acid esters, polyoxysorbitan fatty acid esters, polyoxyethylene alkyl phenyl ethers, polyoxyethylene alkyl ethers, polyethylene glycol, polyoxyethylene diamines, copolymers consisting of polyether, polyester and polyamide, and methoxy polyethylene glycol (meth)acrylate.

Examples of electroconductive polymers include polyaniline, polypyrrole and polythiophene. One type of these electroconductive polymers may be used alone or two or more types may be used in combination.

Examples of electroconductive substances include tin oxide, antimony oxide, indium oxide, cadmium oxide, titanium oxide, zinc oxide, indium, tin, antimony, gold, silver, copper, aluminum, nickel, chromium, titanium, iron, cobalt, copper iodide and alloys or mixtures thereof. One type of these electroconductive substances may be used alone or two or more types may be used in combination.

A general-purpose resin such as polyester resin, acrylic resin, polyvinyl resin, urethane resin, melamine resin or epoxy resin is used for the resin component used in the antistatic coating agent or electroconductive coating agent. In the case of a polymeric antistatic agent, the use of a resin component can be omitted. A methylolated or alkylolated melamine-based, urea-based, glyoxal-based or acrylamide-based compound, epoxy compound or isocyanate compound and the like may be contained in the antistatic coating agent.

The antistatic coating agent or electroconductive coating agent can be in the form of a liquid composition in which an antistatic component (the antistatic agent or electroconductive polymer as previously described) and, as necessary, the resin component used are dispersed or dissolved in a suitable solvent (organic solvent, water or mixed solvent thereof). A method consisting of coating the liquid composition onto a synthetic resin film followed by drying can be preferably employed for the method used to form an antistatic layer. Examples of organic solvents that compose the liquid composition include methyl ethyl ketone, acetone, ethyl acetate, tetrahydrofuran (THF), dioxane, cyclohexanone, n-hexane, toluene, xylene, methanol, ethanol, n-propanol and isopropanol. One species of these solvents may be used alone or two or more species may be used as a mixture.

A commonly known coating method can be suitably used for the method used to coat the liquid composition for forming the antistatic layer. Specific examples of coating methods include roll coating, gravure coating, reverse coating, roll brush coating, spray coating, air knife coating, impregnation coating and curtain coating. The thickness of the antistatic layer is normally roughly 0.01 µm to 5 µm and preferably roughly 0.03 µm to 1 µm.

In the case of providing an antistatic layer by vapor-depositing or plating an electroconductive substance, a conventionally known method such as vacuum deposition, sputtering, ion plating, chemical vapor deposition, spray pyrolysis deposition, chemical plating or electroplating can be suitably employed for the vapor deposition or plating method. The thickness of the electroconductive substance layer formed by these methods is normally roughly 20 Å to 10000 Å and preferably roughly 50 Å to 5000 Å.

During antistatic treatment using a method consisting of mixing an antistatic agent into a film, an antistatic agent similar to the materials listed as examples of antistatic agents used to form the antistatic layer can be employed for the antistatic agent used (antistatic agent for mixing). The incorporated amount of these antistatic agents can be, for example, roughly 20% by weight or less (and typically, 0.05 to 20% by weight) based on the total weight of the film, and normally is suitably within the range of 0.05 to 10% by weight. There are no particular limitations on the method used to mix the antistatic agent provided it is a method that allows the antistatic agent to be uniformly mixed in the synthetic resin material for forming the film, and examples of mixing methods include those using heated rollers, Banbury mixer, pressurized kneader or biaxial kneader.

The PSA layer that composes the surface protective film disclosed herein can be preferably formed by applying a PSA composition as previously described to a prescribed surface followed by drying or curing. Examples of methods that can be employed include a method consisting of directly applying the PSA composition to a support followed by drying or curing to form a PSA layer on the support (direct method); and a method consisting of applying the PSA composition to the surface of a release liner (release surface) followed by drying or curing to form a PSA layer on the surface thereof, and then laminating the PSA layer to a support to transfer the PSA layer to the support (transfer method). From the viewpoint of the anchoring property of the PSA layer, the direct method can normally be preferably employed. When applying (and typically, coating) the PSA composition, various types of methods conventionally known in the field of PSA sheets can be suitably employed, examples of which include coating methods such as roll coating, gravure coating, reverse coating, roll brush coating, spray coating, air knife coating or die coating. The thickness of PSA layer can be, for example, roughly 3 µm to 100 µm, and normally is preferably roughly 5 µm to 50 µm. From the viewpoint of facilitating the obtaining of a surface protective film that satisfies the characteristics (A) and (B), the thickness of the PSA layer is preferably 10 µm to 40 µm.

The surface protective film disclosed herein can be provided in a form in which a release liner is laminated to a PSA surface (in the form of a surface protective film with release liner) for the purpose of protecting the PSA surface (surface of the PSA layer on the side adhered to an adherend). Paper or a synthetic resin film and the like can be used for the substrate that composes the release liner, and a synthetic resin film is used preferably from the viewpoint of superior surface smoothness. For example, a synthetic resin film composed of a resin material similar to that of the support can be preferably used for the substrate of the release liner. The thickness of the release liner can be, for example, roughly 5 µm to 200 µm, and normally is preferably roughly 10 µm to 100 µm. The side of the release liner that is adhered to the PSA layer may be subjected mold release or soiling prevention treatment using a conventionally known mold release agent (such as a silicone-based, fluorine-based, long chain alkyl-based or fatty acid amide-based agent) or silica powder and the like.

The surface protective film disclosed herein may further satisfy one or two or more of the characteristics indicated below.

(C) More than 99.0% of the surface area of the PSA layer is tightly adhered to a polarizing plate 30 minutes after having pressed the surface protective film onto the AG side of the polarizing plate. Namely, adhesiveness to the AG side is greater than 99.0%. Since this surface protective film demonstrates superior adhesiveness to an irregular surface (such as the AG side of a polarizing plate), changes in appearance can be highly inhibited even if subjected to external force and temperature changes. In a more preferable mode of the surface protective film disclosed herein, the adhesiveness is 99.5% or more (and more preferably 99.7% or more). The adhesiveness can be evaluated by, for example, a method similar to that used in the subsequently described examples.

(D) During measurement of peel strength carried out using the technique subsequently described in the examples, the peel strength S1 on a TAC polarizing plate is 3 N/25 mm or less (and typically, 1 to 3 N/25 mm) A surface protective film in which S1 is within the above ranges has a favorable balance between protective performance and peeling workability.

(E) During measurement of peel strength carried out using the technique subsequently described in the examples, the peel strength S2 on an AG polarizing plate is 0.5 to 2 N/25 mm. A surface protective film in which S2 is within the above range has a favorable balance between protective performance and peeling workability.

EXAMPLES

Several experimental examples of the invention are described below, although these specific examples are not intended to limit the scope of the invention. In the description that follows, unless noted otherwise, all references to "parts" and "%" are based on weight.

Each of the characteristics described in the following explanation were respectively measured as indicated below.

[Measurement of Acid Value]

Acid value was measured using an automatic titrator (COM-550, Hiranuma Sangyo Corp.), and determined according to the following equation.

$$A = \{(Y-X) \times f \times 5.611\}/M$$

A: Acid value
Y: Amount of titrating solution required to titrate sample solution (mL)
X: Amount of titrating solution required to titrate 50 g of mixed solvent (mL)
f: Titrating solution factor
M: Weight of polymer sample (g)
Measurement conditions were as indicated below.
Sample solution: The sample solution was prepared by dissolving about 0.5 g of polymer sample in 50 g of mixed solvent (obtained by mixing toluene, 2-propanol and distilled water at a weight ration of 50/49.5/0.5).
Titrating solution: 0.1 N 2-propanolic potassium hydroxide solution (Wako Pure
Chemical Industries, Ltd., for use in petroleum product neutralization number testing)
Electrode: Glass electrode, GE-101
Reference electrode: RE-201
Measurement mode: Petroleum product neutralization number test 1

[Measurement of Molecular Weight]

Molecular weight was measured using a GPC apparatus (Tosoh Corp., HLC-8220GPC). Measurement conditions were as indicated below. Molecular weight was determined based on polystyrene.
Sample concentration: 0.2% by weight (THF solution)
Sample injection volume: 10 μL
Eluant: THF
Flow rate: 0.6 mL/min
Measuring temperature: 40° C.
Columns:
Sample columns: TSKguard Column Super HZ-H (1 column)+
TSKgel Super HZM-H (2 columns)
Reference column: TSKgel Super H-RC (1 column)
Detector: Differential refractometer (RI)

[Measurement of Glass Transition Temperature]

Glass transition temperature (Tg) (° C.) was determined according to the following method using a dynamic mechanical analyzer (Rheometrics Inc., ARES). Namely, acrylic polymer sheets (thickness: 20 μm) were laminated to a thickness of about 2 mm and stamped out in the shape of a circle having a diameter of 7.9 mm to prepare a cylindrical pellet. This pellet was used as the sample for measurement of glass transition temperature. The measurement sample was immobilized in a jig (parallel plates having a diameter of 7.9 mm), temperature dependency of loss elastic modulus G" using the dynamic mechanical analyzer, and defining the temperature where the resulting G" curve reaches a maximum to be the glass transition temperature (° C.). The measurement conditions were as indicated below.
Measurement mode: Shear mode
Temperature range: −70 to 150° C.
Heating rate: 5° C./min
Frequency: 1 Hz

Example 1

200 parts of 2-ethylhexyl acrylate, 8 parts of 2-hydroxyethyl acrylate, 0.4 parts of 2,2'-azobisisobutyronitrile as polymerization initiator and 312 parts of ethyl acetate were placed in a four-mouth flask equipped with a stirring blade, thermometer, nitrogen gas feed tube and dropping funnel followed by introducing nitrogen gas while stirring gently, holding the temperature of the liquid in the flask to the vicinity of 60° C. and carrying out a polymerization reaction for 5 hours to prepare an acrylic polymer A solution (solid convent (NV): 40%). The weight average molecular weight (Mw) of this acrylic polymer A was $55 \times 10^4$, the glass transition temperature (Tg) was −55° C., and the acid value was 0.0.

Ethyl acetate was added to this acrylic polymer A solution (NV: 40%) and diluted to an NV of 20%. 0.1 part of polypropylene glycol diol (PPG) (Wako Pure Chemical Industries, Ltd.) having a number average molecular weight (Mn) of about 3000, 0.6 parts of trimethylolpropane/tolylene diisocyanate trimer addition product as crosslinking agent (Nippon Polyurethane Industry Co., Ltd., trade name: "Coronate L", 75% ethyl acetate solution) and 0.4 parts of dibutyltin dilaurate as crosslinking catalyst (1% ethyl acetate solution) were added to 100 parts of this solution followed by mixing and stirring for about 1 minute at normal temperature (25° C.) to prepare a PSA composition B1.

On the other hand, 10 parts of antistatic agent (Solvex Co., Ltd., Microsolver RMd-142, composed mainly of tin oxide and polyester resin) were diluted with a mixed solvent of water and methanol mixed at a ratio 30/70 (weight ratio) to prepare an antistatic agent solution. This antistatic solution was coated onto one side of a polyethylene terephthalate (PET) film having a thickness of 38 μm using a Mayer bar followed by heating for 1 minute at 130° C. to remove the solvent and form an antistatic layer having a thickness of 0.2 μm. An antistatic-treated PET film was produced in this manner.

The PSA composition B1 was coated onto the side of the antistatic-treated film opposite from the antistatic-treated side followed by heating for 3 minutes at 110° C. to form a PSA layer having a thickness of 20 μm. Next, a silicone-treated side (release side) of a PET film (release liner) having a thickness of 25 μm and subjected to silicone treatment on one side thereof was laminated to the surface of the PSA layer. In this manner, a PSA sheet C1 was obtained having the PSA layer on one side of the antistatic-treated film (support) in a form in which the PSA layer was protected by the release liner.

Example 2

A PSA composition B2 was prepared in the same manner as Example 1 with the exception of changing the amount of PPG added in Example 1 to 0.05 parts, and a PSA sheet C2 was produced using this composition B2.

Example 3

A solution of the acrylic polymer A (NV: 40%) was diluted to an NV of 20% by adding ethyl acetate. 0.20 parts of the same PPG as that used in Example 1, 0.4 parts of an isocyanurate form of hexamethylene diisocyanate (Nippon Polyurethane Industry Co., Ltd., trade name: "Coronate HX") as crosslinking agent, and 0.3 parts of dibutyltin dilaurate (1% ethyl acetate solution) as crosslinking catalyst were added to 100 parts of this solution followed by mixing and stirring for about 1 minute at normal temperature (25° C.) to prepare a PSA composition B3. A PSA sheet C3 was produced in the same manner as Example 1 with the exception of using this PSA composition B3.

Example 4

A PSA composition B4 was prepared in the same manner as Example 3 with the exception of changing the amount of the crosslinking agent in Example 3 to 0.6 parts and changing the amount of PPG added to 0.02 parts, and a PSA sheet C4 was produced using this composition B4.

Example 5

A PSA composition B5 was prepared in the same manner as Example 3 with the exception of changing the amount of the crosslinking agent in Example 3 to 0.8 parts and not using PPG, and a PSA sheet C5 was produced using this composition B5.

Example 6

A PSA composition B6 was prepared in the same manner as Example 1 with the exception of changing the amount of the crosslinking agent in Example 1 to 0.8 parts and not using PPG, and a PSA sheet C6 was produced using this composition B6.

Example 7

A PSA composition B7 was prepared in the same manner as Example 3 with the exception of changing the amount of the crosslinking agent in Example 3 to 0.6 parts and not using PPG, and a PSA sheet C7 was produced using this composition B7.

Compressive creep tests, evaluation of adhesiveness and measurement of peel strength were carried out for the PSA sheets C1 to C7 produced in Examples 1 to 7. The outlines of the PSA compositions used to produce the PSA sheets according to each example are shown in Table 1 and the results obtained are shown in Table 2.

[Compressive Creep Tests]

24 of the PSA sheets from which the release liners had been removed were laminated to produce a sample for compressive creep testing. The sample was in the shape of a square column having a bottom surface measuring 10 mm on a side. The Model "RSA III" dynamic mechanical analyzer manufactured by TA Instruments Inc. was used for the testing apparatus. The amount of strain when a load of 0.195 MPa was applied to the sample for 10 minutes at a measuring temperature of 25° C. using a parallel jig having an end surface diameter of 8 mm (indentation strain $E_1$ (%)), and the amount of strain 10 minutes after releasing the sample from the load (permanent strain $E_2$ (%)) were then measured. The strain recovery coefficient was then calculated from these measurement results according to $E_1/E_2$.

[Measurement of Peel Strength]

Two types of polarizing plates consisting of a plain polarizing plate having a width of 70 mm and length of 100 mm (Nitto Denko Corp., TAC polarizing plate, SEG1425DU) and a polarizing plate of the same size provided with an AG coating (Nitto Denko Corp., AG polarizing plate, AGS1) were prepared for use as adherends. The PSA sheet was cut to a width of 25 mm and length of 100 mm for each release liner, and the release liner was removed to expose the PSA surface. This PSA surface was pressed onto the two types of polarizing plates at a pressure of 0.25 MPa and speed of 0.3 m/min each. After allowing to stand for 30 minutes in an environment at 23° C. and 50% RH, the polarizing plates were peeled from the PSA sheet under conditions of a peeling speed of 30 m/min and a peeling angle of 180 degrees using a universal tensile tester under the same environmental conditions followed by measurement of peel strength at that time. Those results are shown in Table 2. In the table, TAC (S1) represents the peel strength on the TAC polarizing plate, while AG (S2) represents the peel strength on the AG polarizing plate.

[Evaluation of Adhesiveness]

A polarizing plate having a width of 50 mm and length of 60 mm provided with an AG coating (Nitto Denko Corp., AG polarizing plate, AGS1) was prepared for use as an adherend. A PSA sheet was cut to a width of 40 mm and length of 50 mm for each release liner, and the release liner was removed to expose the PSA surface. The PSA surface was then pressed onto the polarizing plate at a pressure (linear pressure) of 0.15 MPa and speed of 5.0 m/min using a roll press. 30 minutes after pressing, the PSA sheet adhered to the polarizing plate was observed from the back side (support side) using a digital microscope manufactured by Keyence Corp. at a magnification factor of 100×. More specifically, image data obtained with the digital microscope was binarized, and the proportion of surface area of the PSA layer where the PSA layer was tightly adhered to the surface of the polarizing plate was determined.

[Evaluation of Appearance]

A tester held the polarizing plate laminated with a protective film between the fingers, and then visually observed any differences in appearance between the portion contacted by the fingers (contact portion) and a portion not contacted by the fingers (non-contact portion) after releasing the fingers from the polarizing plate, followed by an evaluation thereof based on the criteria indicated below.

Good: No difference observed between contact portion and non-contact portion.

Fair: Slight difference observed between contact portion and non-contact portion.

Poor: Clear difference observed between contact portion and non-contact portion.

TABLE 1

| | Composition (parts as solid) | | | |
|---|---|---|---|---|
| | Acrylic | Crosslinking agent | | Crosslinking | |
| | polymer A | Type | Amount | catalyst | PPG |
| Example 1 | 20 | L | 0.60 | 0.0040 | 0.100 |
| Example 2 | 20 | L | 0.60 | 0.0040 | 0.050 |
| Example 3 | 20 | HX | 0.40 | 0.0030 | 0.200 |
| Example 4 | 20 | HX | 0.60 | 0.0030 | 0.020 |
| Example 5 | 20 | HX | 0.80 | 0.0030 | — |
| Example 6 | 20 | L | 0.80 | 0.0040 | — |
| Example 7 | 20 | HX | 0.60 | 0.0030 | — |

Crosslinking agent L: Trade name "Coronate L"
Crosslinking agent HX: Trade name "Coronate HX"

TABLE 2

| | | Peel strength (N/25 mm) | | Peel strength ratio | Compressive creep test | | | |
|---|---|---|---|---|---|---|---|---|
| | | | | | Indentation strain | Permanent strain | Strain recovery | |
| | Adhesiveness (%) | TAC (S1) | AG (S2) | (S1/S2) | (E1) (%) | (E2) (%) | coefficient (E1/E2) | Appearance |
| Ex. 1 | 99.6 | 1.90 | 1.08 | 1.8 | 7.5 | 0.8 | 9.4 | Good |
| Ex. 2 | 99.9 | 2.40 | 1.73 | 1.4 | 10.4 | 1.4 | 7.4 | Good |
| Ex. 3 | 99.9 | 1.55 | 1.13 | 1.4 | 8.0 | 0.9 | 8.9 | Good |
| Ex. 4 | 99.4 | 1.45 | 0.79 | 1.8 | 7.8 | 0.3 | 26 | Good |
| Ex. 5 | 98.0 | 1.80 | 0.70 | 2.6 | 10.0 | 0.2 | 50 | Poor |
| Ex. 6 | 98.9 | 4.50 | 1.80 | 2.5 | 6.7 | 1.0 | 6.7 | Fair |
| Ex. 7 | 99.0 | 2.30 | 1.02 | 2.3 | 8.8 | 0.3 | 29 | Fair |

As is indicated in Tables 1 and 2, the PSA sheets of Examples 1 to 4 that satisfy the characteristics (A) and (B) exhibited favorable adhesiveness to the AG side (and more specifically, adhesiveness of greater than 99.9%). When these PSA sheets of Examples 1 to 4 adhered to the TAC polarizing plate and AG polarizing plate were peeled by hand, there was not that much difference in the feel when peeling between the two types of polarizing plates, and the magnitude of the peel strength ratio S1/S2 was confirmed to be closely reflected in actual peeling workability. In addition, the PSA sheets of Examples 1 to 4 were each confirmed to be free of differences in appearance between the contact portion and non-contact portion in the evaluation of appearance.

In contrast, the PSA sheets of Examples 5 to 7 all exhibited adhesiveness of 99.0% or less. In addition, when the PSA sheets according to Examples 5 to 7 adhered to the TAC polarizing plate and AG polarizing plate were peeled by hand, the feel during peeling was confirmed to be clearly heavier when peeling from the TAC polarizing plate than when peeling from the AG polarizing plate. In the case of the PSA sheet according to Example 5, an obvious difference in appearance was observed between the contact portion and the non-contact portion in the evaluation of appearance.

The PSA composition for a surface protective film disclosed herein can be preferably used in applications such as the formation of a PSA (and typically, a PSA layer) provided on various types of surface protective films, or the production of a surface protective film provided with that PSA. In addition, the surface protective film disclosed herein is preferable for applications involving protecting an optical member during production or transport and the like of an optical member used as a constituent element of a liquid crystal display, plasma display panel (PDP) or organic electroluminescence (EL) display and the like. In particular, the surface protective film is useful as a surface protective film applied to an optical member such as a polarizing plate (polarizing film), retardation plate, phase difference plate, optical compensation film, brightness enhancement film, light diffusion film or reflecting sheet for a liquid crystal display.

The invention claimed is:

1. A surface protective film, provided with a support and a pressure-sensitive adhesive layer provided on a first side of the support, wherein the pressure-sensitive adhesive layer consists of an acrylic polymer as a base polymer thereof, a compound having a polyoxypropylene segment composed of two or more consecutive oxypropylene units, and a crosslinking catalyst, the acrylic polymer is a crosslinked acrylic polymer crosslinked with a crosslinking agent, an amount of the compound having the polyoxypropylene segment composed of the two or more consecutive oxypropylene units is 0.01 to 0.5 parts by weight based on 100 parts by weight of the acrylic polymer, the crosslinking agent is at least one selected from the group consisting of an isocyanate Compound, an epoxy compound, a melamine resin, an aziridine compound and derivatives thereof, the crosslinking catalyst is a tin-based catalyst, and the surface protective film satisfies the following conditions:

(A) an indentation strain E1 of a laminate obtained by laminating 24 of the surface protective films is 7.0% or more, and a ratio (E1/E2) of the indentation strain E1 to a permanent strain E2 is 30 or less, where the indentation strain E1 is a reduction ratio of a thickness T1 to an initial thickness T0 of the laminate, the thickness T1 being obtained when the laminate is placed between circular flat surfaces having a diameter of 8 mm, and a compressive stress of 0.195 MPa is applied for 10 minutes in the direction of thickness at 25° C., and the permanent strain E2 is a reduction ratio of a thickness T2 obtained 10 minutes after the laminate is released from the compressive stress, to the initial thickness T0;

(B) during measurement of peel strength carried out under conditions of a measuring temperature of 23° C., a peeling speed of 30 m/min and a peeling angle of 180 degrees, a peel strength S1 of the surface protective film on a triacetyl cellulose polarizing plate that has not been subjected to anti-glare treatment is two times or less a peel strength S2 of the surface protective film on a triacetyl cellulose polarizing plate that has been subjected to anti-glare treatment.

2. The surface protective film according to claim 1, wherein more than 99.0% of the surface area of the pressure-sensitive adhesive layer is tightly adhered to the anti-glare-treated triacetyl cellulose polarizing plate 30 minutes after the surface protective film is pressed onto the polarizing plate.

3. The surface protective film according to claim 1, wherein the pressure-sensitive adhesive layer comprises the acrylic polymer crosslinked with an isocyanate-based crosslinking agent.

4. The surface protective film according to claim 1, wherein the thickness of the pressure-sensitive adhesive layer is 10 μm to 40 μm.

5. The surface protective film according to claim 1, wherein the support is a polyester film having a thickness of 20 μm to 60 μm.

6. The surface protective film according to claim 1, wherein the support comprises a synthetic resin film that has been subjected to antistatic treatment.

7. The surface protective film according to claim 1, wherein the compound having the polyoxypropylene segment is a polypropylene glycol.

8. The surface protective film according to claim 7, wherein the compound having the polyoxypropylene segment is a polypropylene glycol diol or a polypropylene glycol triol having a number average molecular weight of $1 \times 10^3$ to $5 \times 10^3$.

9. The surface protective film according to claim 8, wherein the pressure-sensitive adhesive layer contains 0.05 to 0.5 parts by weight of the compound having the polyoxypropylene segment based on 100 parts by weight of the acrylic polymer.

10. The surface protective film according to claim 9, wherein the thickness of the pressure-sensitive adhesive layer is 10 μm to 40 μm, and
the support is a polyester film having a thickness of 20 μm to 60 μm.

11. The surface protective film according to claim 1, wherein the acrylic polymer is a copolymer copolymerized with an acrylic monomer having a hydroxyl group within a range of 0.3 to 8% by weight of the total amount of monomer used to synthesize the acrylic polymer.

12. The surface protective film according to claim 11, wherein the thickness of the pressure-sensitive adhesive layer is 10 μm to 40 μm, and
the support is a polyester film having a thickness of 20 μm to 60 μm.

13. The surface protective film according to claim 1, wherein the compound having the polyoxypropylene segment is a polypropylene glycol diol or triol having a number average molecular weight of $1 \times 10^3$ to $5 \times 10^3$,
the pressure-sensitive adhesive layer contains 0.05 to 0.5 parts by weight of the compound having the polyoxypropylene segment based on 100 parts by weight of the acrylic polymer,
the acrylic polymer is a copolymer copolymerized with an acrylic monomer having a hydroxyl group within a range of 0.3 to 8% by weight of the total amount of monomer used to synthesize the acrylic polymer, but substantially not copolymerized with a monomer having an acidic functional group,
the pressure-sensitive adhesive layer is obtained by crosslinking the acrylic polymer under the combined use of an isocyanate-based crosslinking agent and a tin-based crosslinking catalyst,
the thickness of the pressure-sensitive adhesive layer is 10 μm to 40 μm, and
the support is a polyester film having a thickness of 20 μm to 60 μm.

14. A surface protective film, provided with a support and a pressure-sensitive adhesive layer provided on a first side of the support, wherein:
the pressure-sensitive adhesive layer consists of an acrylic polymer as a base polymer thereof, a compound having a polyoxypropylene segment composed of two or more consecutive oxypropylene units, and a crosslinking catalyst,
the acrylic polymer is a crosslinked acrylic polymer crosslinked with a crosslinking agent, and
the surface protective film satisfies the following conditions:
(A) an indentation strain E1 of a laminate obtained by laminating 24 of the surface protective films is 7.0% or more, and a ratio (E1/E2) of the indentation strain E1 to a permanent strain E2 is 30 or less, where the indentation strain E1 is a reduction ratio of a thickness T1 to an initial thickness T0 of the laminate, the thickness T1 being obtained when the laminate is placed between circular flat surfaces having a diameter of 8 mm, and a compressive stress of 0.195 MPa is applied for 10 minutes in the direction of thickness at 25° C., and the permanent strain E2 is a reduction ratio of a thickness T2 obtained 10 minutes after the laminate is released from the compressive stress, to the initial thickness T0; and
(B) during measurement of peel strength carried out under conditions of a measuring temperature of 23° C., a peeling speed of 30 m/min and a peeling angle of 180 degrees, a peel strength S1 of the surface protective film on a triacetyl cellulose polarizing plate that has not been subjected to anti-glare treatment is two times or less a peel strength S2 of the surface protective film on a triacetyl cellulose polarizing plate that has been subjected to anti-glare treatment.

15. The surface protective film according to claim 14, wherein the pressure-sensitive adhesive layer contains 0.01 to 0.5 parts by weight of the compound having the polyoxypropylene segment composed of two or more consecutive oxypropylene units based on 100 parts by weight of the acrylic polymer.

16. The surface protective film according to claim 14, wherein
the crosslinking agent is at least one selected from the group consisting of an isocyanate compound, an epoxy compound, a melamine resin, an aziridine compound and derivatives thereof.

17. The surface protective film according to claim 14, wherein the crosslinking catalyst is a tin-based catalyst.

18. The surface protective film according to claim 14, wherein
the pressure-sensitive adhesive layer contains 0.01 to 0.5 parts by weight of the compound having the polyoxypropylene segment composed of two or more consecutive oxypropylene units based on 100 parts by weight of the acrylic polymer, and
the crosslinking agent is at least one selected from the group consisting of an isocyanate compound, an epoxy compound, a melamine resin, an aziridine compound and derivatives thereof.

19. The surface protective film according to claim 14, wherein
the pressure-sensitive adhesive layer contains 0.01 to 0.5 parts by weight of the compound having the polyoxypropylene segment composed of two or more consecutive oxypropylene units based on 100 parts by weight of the acrylic polymer, the crosslinking agent is at least one selected from the group consisting of an isocyanate compound, an epoxy compound, a melamine resin, an aziridine compound and derivatives thereof, and the crosslinking catalyst is a tin-based catalyst.

20. The surface protective film according to claim 14, wherein the crosslinking agent is at least one selected from the group consisting of an isocyanate compound, an epoxy compound, a melamine resin, an aziridine compound and derivatives thereof, and the crosslinking catalyst is a tin-based catalyst.

* * * * *